UNITED STATES PATENT OFFICE.

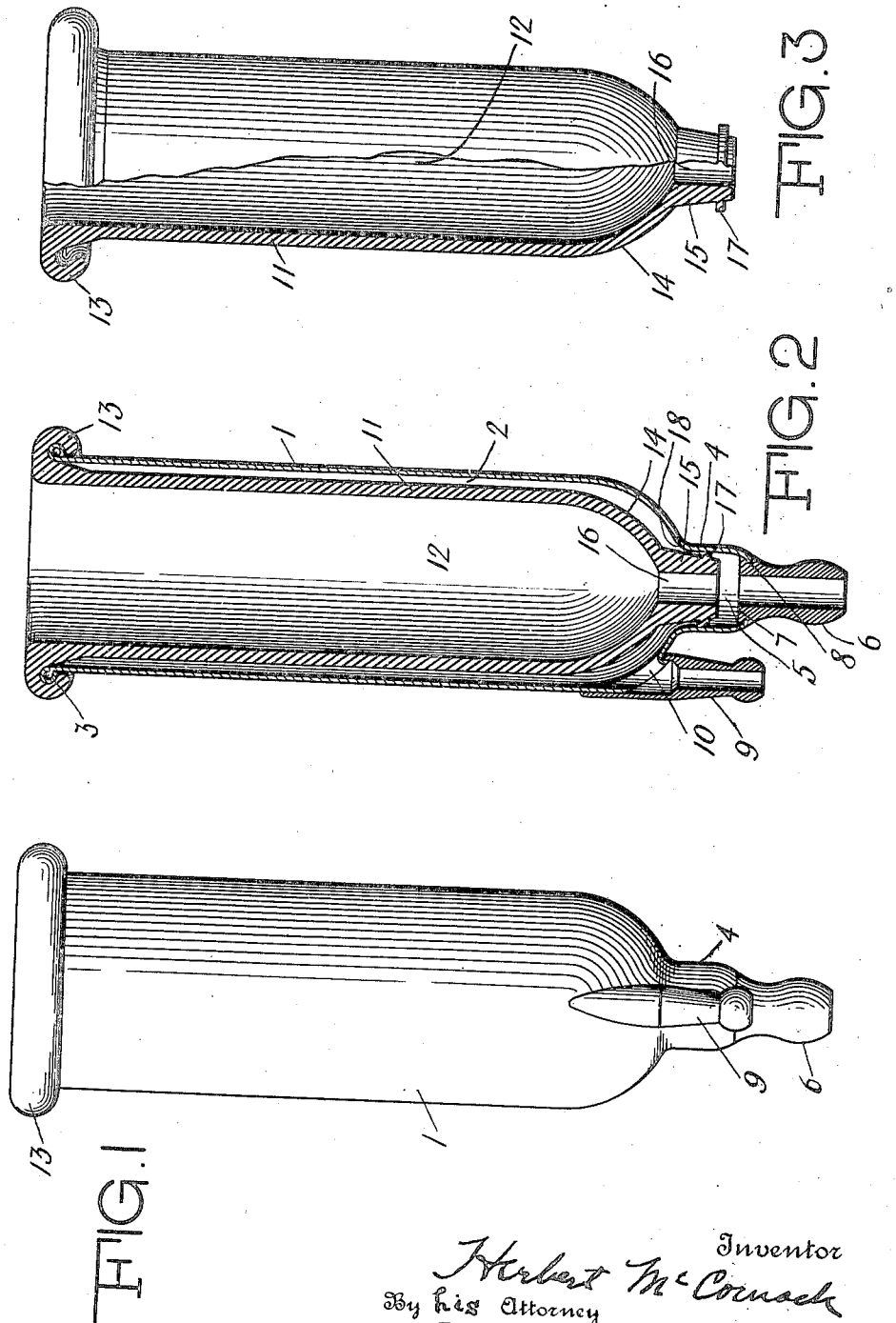

HERBERT McCORNACK, OF GLEN RIDGE, NEW JERSEY, ASSIGNOR TO EMPIRE CREAM SEPARATOR COMPANY, OF BLOOMFIELD, NEW JERSEY, A CORPORATION OF NEW JERSEY.

TEAT-CUP.

1,385,050.  Specification of Letters Patent.  Patented July 19, 1921.

Application filed November 21, 1917. Serial No. 203,137.

*To all whom it may concern:*

Be it known that I, HERBERT McCORNACK, a citizen of the United States, residing at Glen Ridge, county of Essex, and State of New Jersey, have invented certain new and useful Improvements in Teat-Cups, of which the following is a specification.

This invention relates to teat cups for cow milking apparatus and particularly to cups of the double or multiple chambered type in which there is an outer casing and a flexible lining or "inflation."

Among the objects of the invention are the provision of a teat cup of the character described which is of the simplest possible construction and in which the flexible lining of the cup may be removed and replaced with great ease so as to facilitate the cleaning of the cup and its maintenance in a sanitary condition; the provision of a structure in which irregularities in the dimensions of the lining either resulting from the process of manufacture or caused by stretching or shrinkage are taken care of in such a way as not to interfere in any way with the operation of the device; the provision of a structure such that the strain on the lining is minimized, resulting in great durability of the lining; and the provision of a structure which will act most efficaciously upon the cow's teat to withdraw the milk therefrom and to prevent congestion in or injury to any part of the teat.

In the accompanying drawings which illustrate one preferred embodiment of the invention;

Figure 1 is a side elevation of the teat cup,

Fig. 2 is a longitudinal central section through the cup and,

Fig. 3 is a view partly in elevation and partly in section of the flexible lining.

Referring to the drawings in detail, the numeral 1 designates the casing of the teat cup which is preferably formed of metal or other relatively rigid material and which incloses the outer teat cup chamber 2. At its upper end the casing is preferably provided with a bead 3, while at the lower end is a portion 4 of reduced diameter inclosing a small chamber or pocket 5 communicating with the main outer chamber 2. The casing may conveniently be formed of a drawn metal tube reduced in diameter at its lower end as indicated. For the attachment of the milk pipe a nipple 6 is provided, it being shown as having a head 7 inserted within the margin of the tubular portion 4, such margin being then swaged or spun into the groove 8 in the nipple thus retaining the nipple in place and making a smooth and tight joint. A nipple 9 for the attachment of the pulsation pipe is also provided, this nipple being attached in any suitable manner as by soldering. The casing may be provided with an outwardly turned flange 10 around which the nipple fits and to which it is secured. 11 is the flexible lining or inflation which is formed so as to provide an inner chamber 12 in the teat cup which receives the cow's teat. The lining 11 is formed of any suitable flexible material, preferably rubber, either with or without a fabric reinforcement of the character described in the United States Letters Patent No. 1,146,584. At its upper end the lining is provided with a lip 13 adapted to be stretched over and inclose the bead 3 whereby a sufficiently firm but easily detachable connection is obtained between the upper end of the lining and the casing. At its lower end the lining 11 is reduced in diameter, preferably with the inward curvature of the form disclosed in the above mentioned Letters Patent and as indicated in the drawing at 14. The lining terminates in a neck 15 preferably of considerably smaller diameter than that of the main body. This neck which is provided with an outlet passage 16, projects into the pocket 5 at the lower end of the casing and makes a tight fit with the inner wall of said pocket. For the latter purpose it is preferably provided with an outwardly projecting flange 17 of slightly greater diameter than the inner diameter of the pocket. This flange when the neck is inserted in the pocket will be turned up somewhat, as indicated in Fig. 2, and owing to this deformation will act to resist the movement of the neck out of the pocket. The frictional or yielding connection thus produced together with the frictional and yielding connection at the upper end of the teat cup formed by the engagement between the lip 13 and the bead 3 are sufficient to prevent the accidental displacement of the lining from the casing while at the same time permitting the instantaneous removal of the lining by simply pulling the same out of the casing whenever cleaning is necessary. The lining may be reinserted in the casing by simply pushing the same therein and hooking and stretching the lip over the bead. The lining is preferably made of such stiffness that it will substantially hold its shape when being handled, so that the neck may be easily located in the pocket 5. In order to further facilitate the insertion of the neck in the pocket the corner between the lower portion of the casing and the pocket wall 4 is preferably rounded as indicated at 18.

The teat cup of the present invention is especially designed for use in that type of milking apparatus in which a continuous suction is applied to the inner chamber of the cup through the main suction of milk pipe connected to the nipple 6, while pulsations of alternate suction and atmospheric pressure are applied to the outer chamber through a pipe connected to the nipple 9. The invention is not limited, however, to use in apparatus of this particular kind. Where the continuous and intermittent suctions are applied in respective chambers of the general form and character illustrated, the effect of each of these suctions is to draw the neck into the pocket more firmly and insure the tight sealing of the joint between the lining and casing at the lower end. Thus leakage is prevented and there is no chance for the neck to get out of position while the milking operation is taking place. When the suction is cut off the frictional engagement of the neck and flange within the pocket is sufficient to retain the lower end of the lining in place. It is to be noted that the connection between the neck and the pocket is not an immovable one so that variations in the length of the lining within reasonable limits will not prevent the proper functioning of the device; thus if the lining stretches with use or shrinks by reason of climatic conditions or otherwise it may nevertheless be properly fitted within the casing. It will also be seen that the lining will not be unduly stretched if it shortens up when contracted to squeeze the teat as the neck will simply be drawn up slightly in the pocket without breaking the tight connection. This avoids unduly stretching the lining and greatly prolongs the life of the latter. In fact reinforcement of the lining may, in most cases, be dispensed with, thus reducing the cost and increasing the flexibility thereof.

Another feature of the construction disclosed is that there is no attaching flange or holding means of rigid material within the lower end of the lining but the latter is entirely flexible so that it may collapse completely to the tip thereby permitting the pressure to be applied to the entire teat. This prevents the lower end of the teat from becoming congested as is sometimes the case where a teat cup is used in which the lower end of the lining is prevented from completely collapsing. The absence of a rigid member within the lower end of the lining also permits the free flexing of the latter in such a way as to avoid any sharp bending or tendency of the lining to tear or become cut as may take place where there is a rigid retaining member extending within the lining.

While I have illustrated and described in detail but one embodiment of my invention it is to be understood that modifications may be made therein and I do not therefore intend to limit myself to such specific example but intend to cover my invention broadly in whatever form its principle may be embodied.

Having thus described my invention I claim:

1. In a teat cup of the character described, the combination of a casing and a flexible lining held in said casing at its lower end by suction.

2. In a teat cup of the character described, the combination of a casing and a flexible lining held in said casing by frictional engagement between the lining and casing, without the use of auxiliary fastening means.

3. In a teat cup of the character described, the combination of a casing and a flexible lining held in said casing by frictional engagement and suction only.

4. In a teat cup of the character described, the combination of a casing and a flexible lining supported by said casing at its upper and lower ends, said lining being sealed in engagement with the casing at the lower end by suction.

5. In a teat cup of the character described, the combination of a casing and a flexible lining having its lower end terminating within said casing and retained therein, said casing and said flexible lining being free from interlocking means for retaining the lower end of said lining within said casing.

6. In a teat cup of the character described, the combination of a casing and a flexible lining having its lower end terminating within said casing and retained therein by frictional engagement with the inner surface of said casing.

7. In a teat cup of the character described, the combination of a casing having a pocket at the lower end thereof and a flexible lining in said casing having a neck held in said pocket by yielding, frictional engagement.

8. In a teat cup of the character described, the combination of a casing having a pocket at the lower end thereof and a flexible lining in said casing having a neck entering said pocket, said neck having a flange thereon of normally slightly greater diameter than the inner diameter of said pocket.

9. In a teat cup of the character described, the combination of a casing having a nipple for the connection of a suction pipe projecting from the lower end thereof, and a flexible lining within the casing terminating above said nipple and making a sealed connection at its lower end with the casing so as to divide the space within the casing into inner and outer chambers, the lining having a milk passage at its lower end communicating with said nipple, the interior of the milk passage and of the lower part of the lining being unobstructed by any rigid member.

10. In a teat cup of the character described, the combination of a casing having a nipple for the attachment of a suction pipe projecting from its lower end, and a lining of flexible material, but of sufficient stiffness to substantially retain its shape when handled, mounted within the casing, and making sealed connection therewith at its upper and lower ends so as to divide the space within said casing into inner and outer chambers, the lining being adapted to be brought into such sealed connection with the casing, by simply pushing the same into the casing through the open upper end thereof.

11. In a teat cup of the character described, the combination of a casing having a pocket of reduced diameter at its lower end and a flexible lining mounted in said casing and having a neck extending into said pocket, the lower end of said casing extending beyond the end of said neck and carrying a discharge nipple.

12. A teat cup lining of flexible material having a hollow teat-receiving portion and an inwardly curving lower end portion terminating in a downwardly projecting perforated neck of reduced diameter, said neck having a narrow flexible flange of angular cross section projecting laterally therefrom at a point substantially removed from the lower inwardly curved part of the lining.

13. A teat cup lining of flexible material but of sufficient stiffness to substantially retain its shape when handled, said lining having a turned-over lip at its upper end and a neck of reduced diameter at its lower end, said neck being provided with a narrow outwardly projecting flange.

14. A teat cup lining of molded rubber having a turned-over lip at its upper end and reduced in diameter at its lower end and terminating in a downwardly projecting perforated neck having walls of sufficient thickness to make the neck relatively stiff, said neck having a relatively flexible flange projecting laterally therefrom at a point substantially removed from where the neck joins the lining.

15. A teat cup lining of rubber having a portion forming a teat-receiving chamber, and a downwardly projecting neck portion below the teat receiving portion having a slightly conical downwardly tapered outer surface.

16. A teat cup casing formed of ductile metal and having its lower end reduced in diameter and a nipple having a head inserted within the margin of said reduced portion, said margin being contracted beneath said head so as to secure said nipple to said casing.

17. A teat cup casing comprising a metal shell drawn down at its lower end to provide a pocket portion of reduced diameter and having an opening formed near its lower end at one side of said pocket portion, the metal of the shell around said opening being turned outwardly to form a flange, a nipple attached to said flange, and a second nipple fixed to the lower end of said pocket portion.

18. A teat cup casing comprising a main body part inclosing an outer teat cup chamber and having an extension of reduced diameter inclosing a pocket the inner side wall of which is substantially cylindrical and merges into the lower part of the chamber wall, a nipple carried by said extension and having a discharge orifice opening into said pocket and a second nipple opening into the main portion of the casing.

HERBERT McCORNACK.